US011981001B2

(12) United States Patent
Hsieh

(10) Patent No.: US 11,981,001 B2
(45) Date of Patent: May 14, 2024

(54) ALERTING STRUCTURE OF ELECTRONIC TORQUE TOOL

(71) Applicant: KABO Tool Company, Taichung (TW)

(72) Inventor: Chih-Ching Hsieh, Taichung (TW)

(73) Assignee: KABO Tool Company, Taichung (TW)

(*) Notice: Subject to any disclaimer, the term of this patent is extended or adjusted under 35 U.S.C. 154(b) by 431 days.

(21) Appl. No.: 17/456,692

(22) Filed: Nov. 29, 2021

(65) Prior Publication Data

US 2022/0184782 A1 Jun. 16, 2022

(30) Foreign Application Priority Data

Dec. 10, 2020 (TW) ................................ 109143722

(51) Int. Cl.
*B25B 23/14* (2006.01)
*B25B 23/142* (2006.01)

(52) U.S. Cl.
CPC ................................ *B25B 23/1425* (2013.01)

(58) Field of Classification Search
CPC .......................... B25B 23/1425; B25B 13/463
See application file for complete search history.

(56) References Cited

U.S. PATENT DOCUMENTS 7,222,544 B1 * 5/2007 Jenkins ................. G01L 25/003 73/862.21
7,841,245 B1 * 11/2010 Chen ........................ G01D 7/00 73/862.23
2007/0051186 A1 * 3/2007 Gharib ................ B25B 23/1427 73/862.21
2008/0006130 A1 * 1/2008 Hsieh ...................... B25B 13/08 81/467
2008/0168871 A1 * 7/2008 Gharib ................ B25B 23/1425 81/479
2009/0120247 A1 * 5/2009 Hsieh .................. B25B 23/1425 81/177.1
2010/0000381 A1 * 1/2010 Takahashi ............. B25B 13/481 433/141
2011/0283845 A1 * 11/2011 Huang ................ B25B 23/1425 81/479
2012/0067178 A1 * 3/2012 Huang ................ B25B 23/1425 81/479
2012/0255404 A1 * 10/2012 Chang ................. B25B 23/1425 81/479
2012/0255405 A1 * 10/2012 Chang .................... B25G 1/043 81/479
2013/0263707 A1 * 10/2013 Hsieh .................. B25B 23/1425 81/467

(Continued)

*Primary Examiner* — David J Bolduc

(74) *Attorney, Agent, or Firm* — Wang Law Firm, Inc.

(57) ABSTRACT

An alerting structure of an electronic torque tool includes a tool body and an electronic module. The electronic module includes a sensing unit, a processing unit, and at least one display unit. The sensing unit senses an operational value of the tool body. The processing unit sends the operational value sensed by the sensing unit to the display unit. The display unit has at least one display block. When the operational value sensed by the sensing unit reaches a predetermined value, the processing unit generates a rotation signal in order for the contents displayed by the display block of the display unit to rotate back and forth through a predetermined angle and thereby produce a conspicuous alerting effect.

13 Claims, 5 Drawing Sheets

(56) References Cited

U.S. PATENT DOCUMENTS

| | | | | |
|---|---|---|---|---|
| 2014/0039810 | A1 * | 2/2014 | Wener | B25B 23/1425 702/41 |
| 2014/0066712 | A1 * | 3/2014 | Robertson | A61B 1/00096 600/109 |
| 2016/0221166 | A1 * | 8/2016 | Hsieh | B25B 23/1425 |
| 2020/0180126 | A1 * | 6/2020 | Hsieh | B25B 23/1425 |

* cited by examiner

ALERTING STRUCTURE OF ELECTRONIC TORQUE TOOL

BACKGROUND OF THE INVENTION

1. Technical Field

The present invention relates to a hand tool and more particularly to an alerting structure of an electronic torque tool, wherein the alerting structure includes a display block whose displayed contents can be rotated back and forth through an angle to produce an enhanced alerting effect.

2. Description of Related Art

Referring to FIG. 1, a conventional electronic torque tool 10 has a tool body 11 and an electronic module 12. The electronic module 12 has a sensor 121, a processing unit 122, and a display unit 123. The sensor 121 is attached to a predetermined portion of the tool body 11 and is configured to sense the deformation of the tool body 11 and send the sensed value to the processing unit 122 in order for the display unit 123 to display the sensed value. If the sensed value exceeds a preset value, e.g., a preset torque value, while the tool 10 is being operated, the display unit 123 will generally display an alert, e.g., with changing light or flashing text, in order to warn the user not to operate the tool 10 any further.

The display function of the display unit 123, e.g., the displaying of a flashing numerical value, typically involves making the same text or pattern flash repeatedly. Neither is the flashing mode conspicuous, nor will the numerical value change during the intervals between consecutive flashes. The resulting flashing alert, therefore, is not easily perceptible, and it is very likely that the user will operate the tool 10 beyond the preset torque value without knowing it, which causes trouble in use.

BRIEF SUMMARY OF THE INVENTION

The primary objective of the present invention is to provide an alerting structure in which the contents displayed by a display block can change their display angle alternately during an alerting process.

To achieve the foregoing objective, the present invention provides an alerting structure of an electronic torque tool, wherein the alerting structure includes a tool body and an electronic module.

The tool body has a shank. The front end of the shank has a working head while the rear end of the shank forms a gripping end.

The electronic module includes a sensing unit, a processing unit, and at least one display unit. The sensing unit is provided on the shank of the tool body and is configured to sense an operational value of the tool body. The processing unit is electrically connected to the sensing unit and the display unit. The data (i.e., the operational value) sensed by the sensing unit is sent to the processing unit, which in turn sends the operational value to the display unit. The display unit has at least one display block. When the value sensed by the sensing unit reaches a predetermined value, the processing unit generates a rotation signal in order for the contents displayed by the display block of the display unit to rotate back and forth through a predetermined angle and thereby produce an alerting effect.

Preferably, the display unit has at least two display blocks, the display blocks are arranged along a longitudinal direction defined between the front and rear ends of the shank, and the contents displayed respectively by the display blocks of the display unit are rotated independently.

The alerting structure of an electronic torque tool provided by the present invention can produce a desirable alerting effect by rotating the contents displayed by the at least one display block of the display unit back and forth, i.e., by changing the display angle of the displayed contents of the display block back and forth, allowing a user to know for sure that the magnitude of the torque applied has reached a preset value.

BRIEF DESCRIPTION OF THE SEVERAL VIEWS OF THE DRAWINGS

In order for the examiner to better understand the objectives, features, and intended effect of the present invention, two preferred embodiments of the invention are detailed below with reference to the accompanying drawings, in which.

DETAILED DESCRIPTION OF THE INVENTION

Figure 1:
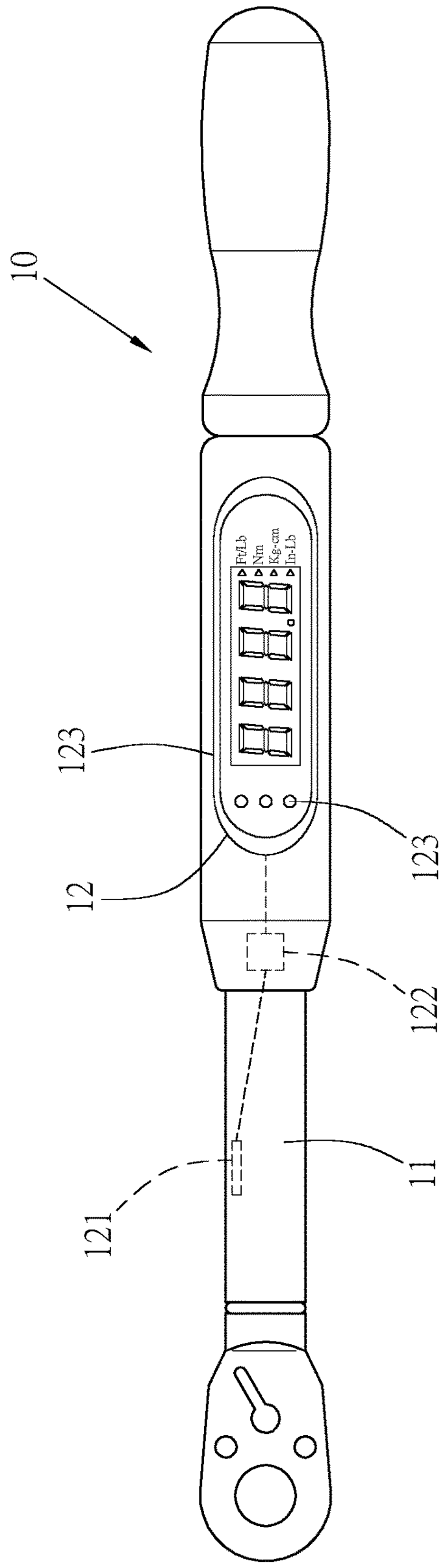
FIG. 1 schematically shows how a conventional electronic torque tool produces a torque value alert.

Referring to FIG. 2 to FIG. 5, the electronic torque tool 20 according to the first preferred embodiment of the present invention includes a tool body 30 and an electronic module 40.

The tool body 30 has a shank 31 and a working head 32. The front end of the shank 31 is connected to the working head 32. The rear end of the shank 31 forms a gripping end 311. The working head 32 and the gripping end 311 define a longitudinal direction therebetween. The working head 32 can be used to apply a torque whose lever arm is provided by the shank 31. The working head 32 in this embodiment is a ratchet head; the present invention, however, has no limitation on the configuration of the working head 32. The working head 32 is a conventional structure and therefore will not be described in more detail.

The electronic module 40 is provided on the tool body 30 and has a sensing unit 41, a processing unit 42, and a display unit 43. The sensing unit 41 in this embodiment is a strain gage, but the sensing unit 41 may alternatively be another sensor capable of sensing the desired operational value (e.g., a torque or angle) of the tool body 30. The sensing unit 41 is attached to the shank 31 of the tool body 30 and is configured to sense the deformation of the shank 31 when the shank 31 is subjected to an applied force. The processing unit 42 is electrically connected to the sensing unit 41 and the display unit 43. The processing unit 42 is configured to receive the sensing signal of the sensing unit 41, calculate an operational value (e.g., a torque value as in this embodiment) from the sensing signal, and send the operational value to the display unit 43 in order for the display unit 43 to display the operational value. The processing unit 42 also allows a torque value to be preset so that when the torque value sensed by the sensing unit 41 reaches the preset torque value, the processing unit 42 will generate a rotation signal. The display unit 43 includes three display blocks 431, 432, and 433. The display blocks 431, 432, and 433 are sequentially arranged along the longitudinal direction of the tool from the rear gripping end 311 toward the front working head 32. In addition, an indicator block 436 is provided near the gripping end 311. The display blocks 431, 432, and 433 are configured to display the three digits (namely the ones digit, the tens digit, and the hundreds digit) of a three-digit torque value respectively. The display blocks may also be configured to display patterns, text, or symbols as needed; the present invention has no limitation in this regard.

Figure 2:
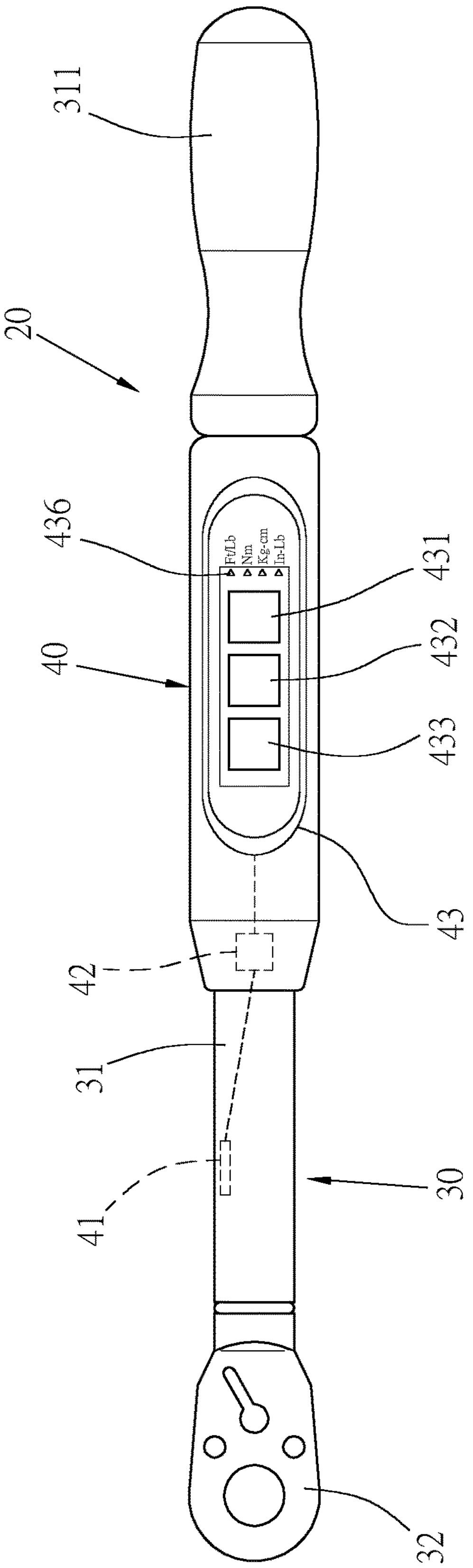
FIG. 2 is a top view of the first preferred embodiment of the present invention.
Figure 3:
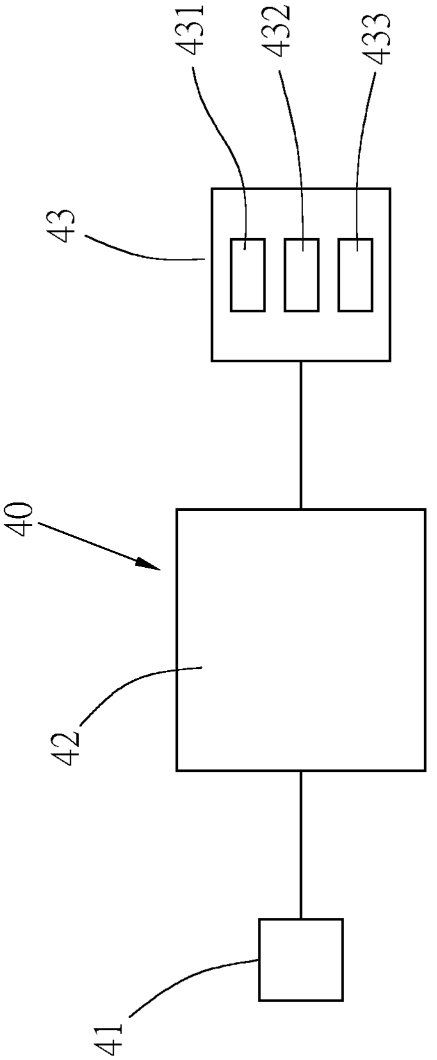
FIG. 3 schematically shows how the components of the electronic module in the first preferred embodiment of the invention are connected.
Figure 4:
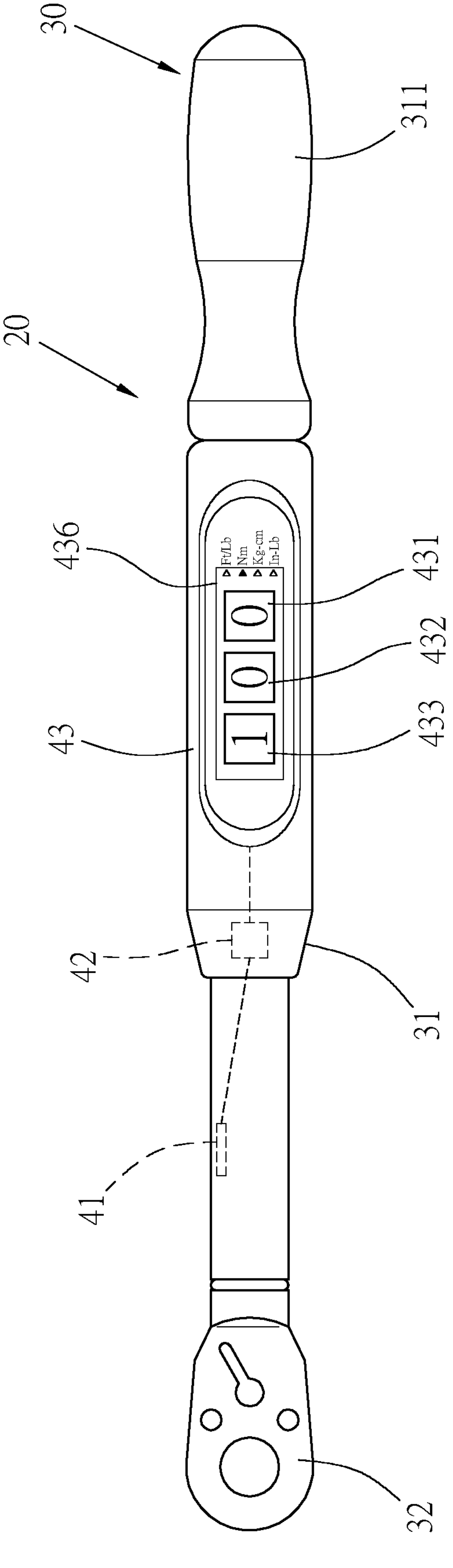
FIG. 4 schematically shows a state of use of the electronic torque tool according to the first preferred embodiment of the invention.

To use the tool body 30, referring to FIG. 2 to FIG. 4, the user grips the gripping end 311 of the shank 31 and applies a rotating force to the working head 32 in order for the working head 32 to perform a tightening or loosening operation on a workpiece. The shank 31 will be deformed while a force is applied by the tool body 30, and the sensing unit 41 can sense the deformation of the shank 31 and send the sensed value to the processing unit 42. The processing unit 42 will in turn convert the sensed value into the corresponding torque value and send the torque value to the display unit 43, in order for the display blocks 431, 432, and 433 of the display unit 43 to display the ones digit, tens digit, and hundreds digit of the torque value respectively, thereby allowing the user to know the current torque value during operation. The indicator block 436 is configured to indicate the torque unit in use or perform other indication functions.

Figure 5:
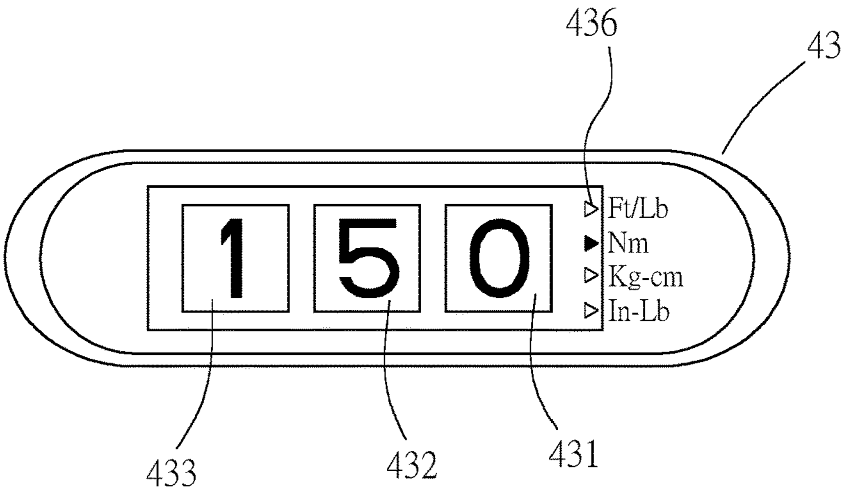
FIG. 5 schematically shows the first alerting action performed by the electronic torque tool according to the first preferred embodiment of the invention when the value, i.e., magnitude, of the torque applied by the electronic torque tool reaches a preset value.
Figure 6A:
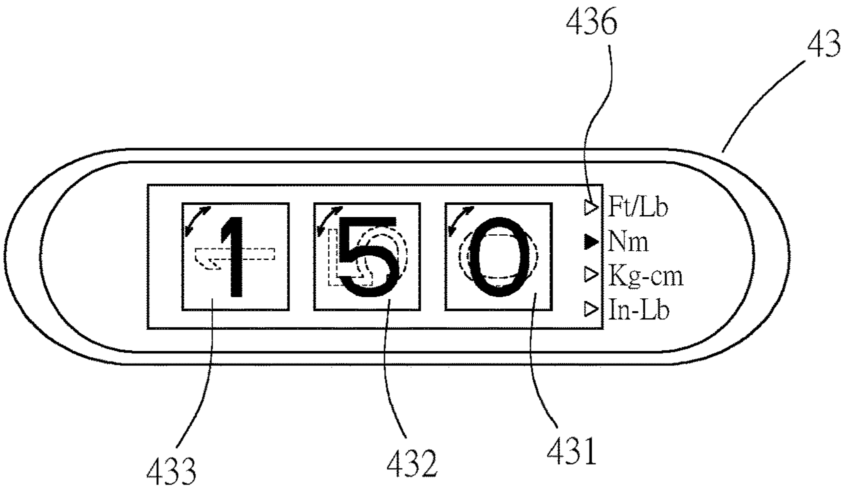
FIG. 6A schematically shows an alteration of the first and second alerting actions performed by the electronic torque tool according to the first preferred embodiment of the invention when the magnitude of the torque applied by the electronic torque tool reaches the preset value.
Figure 6B:
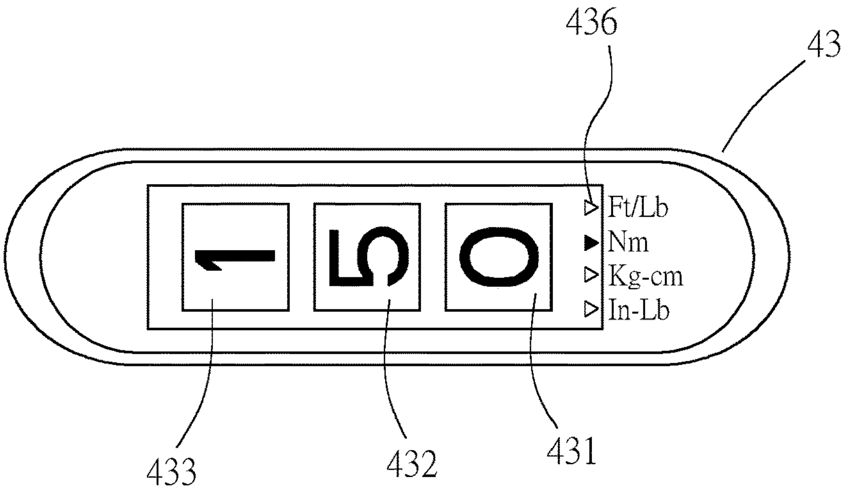
FIG. 6B schematically shows the second alerting action performed by the electronic torque tool according to the first preferred embodiment of the invention when the magnitude of the torque applied by the electronic torque tool reaches the preset value.
Figure 7A:
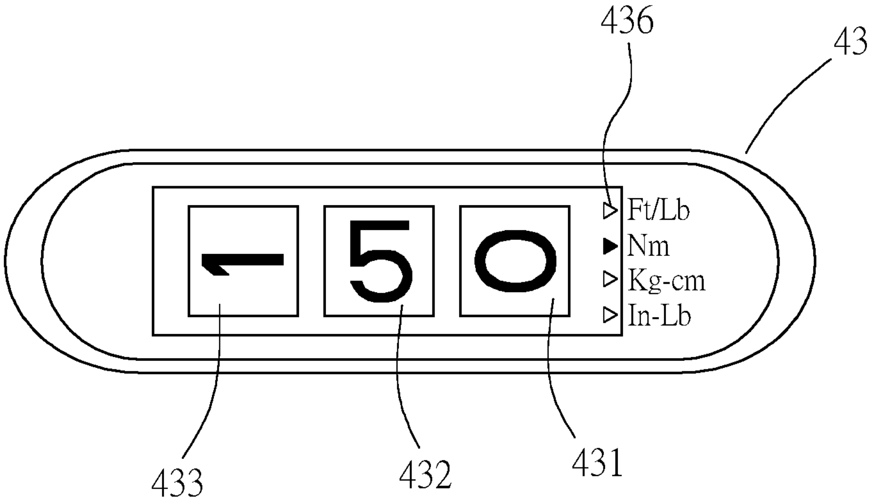
FIG. 7A schematically shows another second alerting action performed by the electronic torque tool according to the first preferred embodiment of the invention when the magnitude of the torque applied by the electronic torque tool reaches the preset value.
Figure 7B:
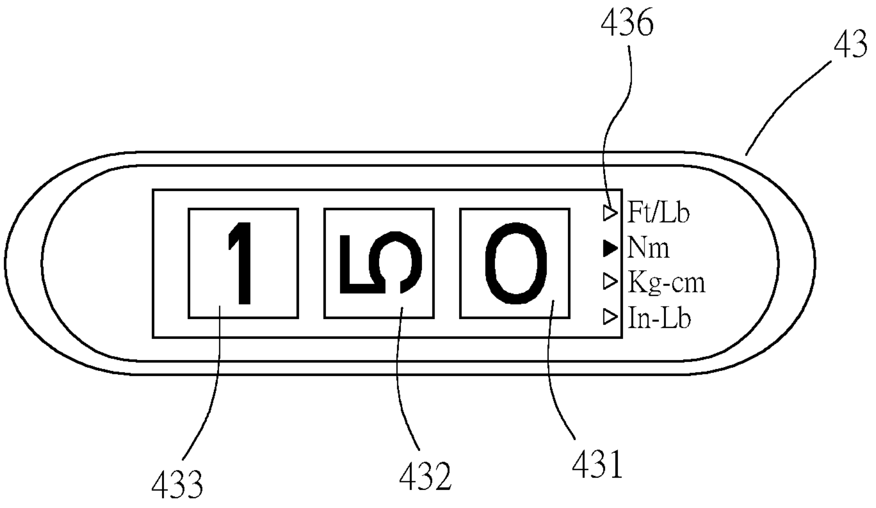
FIG. 7B schematically shows yet another second alerting action performed by the electronic torque tool according to the first preferred embodiment of the invention when the magnitude of the torque applied by the electronic torque tool reaches the preset value.

Referring to FIG. 5, FIG. 6A, and FIG. 6B, when the sensing unit 41 senses that the value, i.e., magnitude, of the torque applied by the tool body 30 reaches the preset value (e.g., 150 N·m) in the processing unit 42, the processing unit 42 generates a rotation signal to the display unit 43. The rotation signal causes the torque value digits displayed respectively by the display blocks 431, 432, and 433 of the display unit 43 to rotate back and forth through a predetermined angle. In this embodiment, the predetermined rotation angle is 90°, and each digit alternates between the two sides of the angle continuously. With the digits displayed respectively by the display blocks 431, 432, and 433 rotating back and forth through the predetermined angle, the resulting alerting effect can be clearly seen by the user so as to stop the user from applying any more force. Referring to FIG. 6A, the digits displayed respectively by the display blocks 431, 432, and 433 may be rotated to the same angular positions at the same time. Alternatively, as shown in FIG. 7A and FIG. 7B, the digits displayed respectively by the display blocks 431 and 433 may be rotated in unison through the predetermined angle in the same direction while the digit displayed by the other display block 432 is rotated through the same angle in the opposite direction, with the digits displayed respectively by the two groups of display blocks (i.e., the display blocks 431 and 433 as one group and the display block 432 as the other group) switching their rotation directions alternately.

Figure 8:
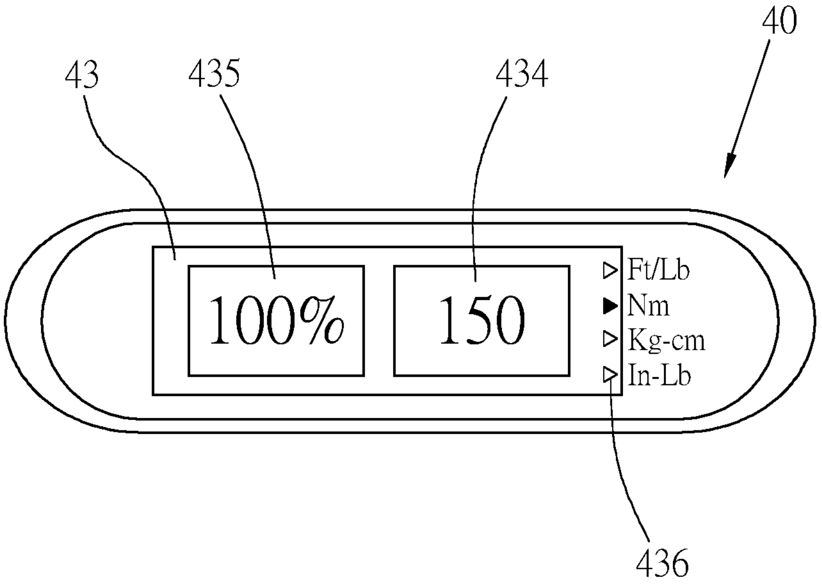
FIG. 8 schematically shows the first alerting action performed by the electronic torque tool according to the second preferred embodiment of the invention when the magnitude of the torque applied by the electronic torque tool reaches a preset value.
Figure 9:
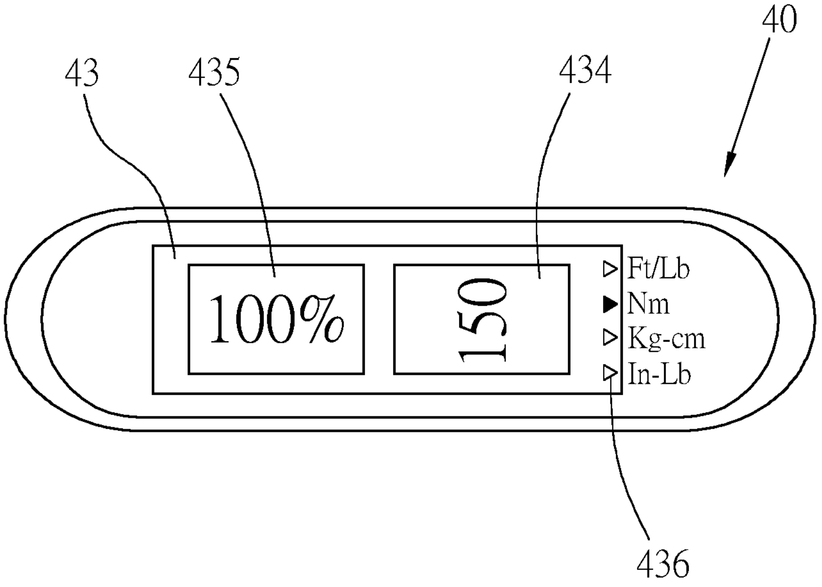
FIG. 9 schematically shows the second alerting action performed by the electronic torque tool according to the second preferred embodiment of the invention when the magnitude of the torque applied by the electronic torque tool reaches the preset value.

FIG. 8 and FIG. 9 show the electronic torque tool according to the second preferred embodiment of the present invention. The second preferred embodiment has practically the same main structure as the previous embodiment. Identical elements in the two embodiments are indicated by the same reference numeral and will not be described repeatedly.

In the second preferred embodiment, the display unit 43 has a display block 434 and a stationary display block 435. The display block 434 is configured to display an entire three-digit torque value, i.e., all the three digits of the torque value. The stationary display block 435, on the other hand, is configured to display the percentage of a preset torque value that the sensed torque value has reached, allowing the user to directly read the percentage reached as well as the current torque value during operation. The contents displayed by the display block 434 and by the stationary display block 435, however, are not limited to those described above and may be the same operational value. When the processing unit 42 receives from the sensing unit 41 the sensing result that the magnitude of the torque applied by the tool body 30 has reached a preset torque value, the processing unit 42 generates a rotation signal that causes the entire operational value displayed by the display block 434 of the display unit 43 to rotate back and forth. Meanwhile, the torque percentage displayed by the stationary display block 435 is 100%, without being rotated. Thus, the user not only can be alerted by the rotational change of the contents displayed by the display block 434 of the display unit 43, but also can clearly read at the same time the value displayed by the stationary display block 435.

The alerting structure provided by the present invention is so designed that, upon receiving from the sensing unit the sensing result that the magnitude of the torque applied by the tool body has reached a preset value, the processing unit will rotate the displayed contents of the display blocks back and forth and thereby produce a conspicuous alerting effect. Compared with the conventional alerting structures, which produce a relatively inconspicuous alerting effect (e.g., with changing light or flashing text), the alerting structure of the invention can produce an alerting effect that covers a larger area and involves a more significant change so that a user can see the changing alert more clearly.

The embodiments described above serve only to expound, but not to limit, the technical means of the present invention. All equivalent modifications of the invention shall fall within the scope of the patent protection sought by the applicant. The alerting structure of the invention is the first of its kind in the art and provides an improvement of a practical function, so a patent application for the invention is hereby filed according to law.

What is claimed is:

1. An alerting structure of an electronic torque tool, comprising:

a tool body having a shank, wherein the shank has a front end with a working head and a rear end forming a gripping end; and an electronic module comprising a sensing unit, a processing unit, and at least one display unit, wherein the sensing unit is provided on the shank of the tool body and is configured to sense an operational value of the torque tool, the processing unit is electrically connected to the sensing unit and the display unit, and after the sensing unit sends the operational value sensed thereby to the processing unit, the processing unit sends the operational value to the display unit;

wherein the display unit has at least one display block for displaying the operational value, and when the operational value sensed by the sensing unit reaches a predetermined value, the processing unit generates a rotation signal in order for contents displayed by the display block of the display unit to rotate back and forth through a predetermined angle and thereby produce an alerting effect.

2. The alerting structure of claim 1, wherein the display unit has at least two said display blocks, and the contents displayed respectively by the display blocks are rotated independently.

3. The alerting structure of claim 2, wherein the contents displayed respectively by the display blocks of the display unit are rotated in a same direction simultaneously.

4. The alerting structure of claim 2, wherein the contents displayed respectively by the display blocks of the display unit are rotated simultaneously but in different directions.

5. The alerting structure of claim 2, wherein the contents displayed respectively by the display blocks of the display unit are rotated in different directions.

6. The alerting structure of claim 1, wherein the display unit further comprises a stationary display block, and after the display unit receives the rotation signal, contents displayed by the stationary display block stay in place without being rotated.

7. The alerting structure of claim 2, wherein the display unit further comprises a stationary display block, and after the display unit receives the rotation signal, contents displayed by the stationary display block stay in place without being rotated.

8. The alerting structure of claim 1, wherein the predetermined angle through which the contents displayed by each said display block of the display unit are rotated is 90°.

9. The alerting structure of claim 2, wherein the predetermined angle through which the contents displayed by each said display block of the display unit are rotated is 90°.

10. The alerting structure of claim 1, wherein each said display block of the display unit is configured to display one of text, a number, and a pattern.

11. The alerting structure of claim 2, wherein each said display block of the display unit is configured to display one of text, a number, and a pattern.

12. The alerting structure of claim 2, wherein the shank has a longitudinal direction defined as a direction between the front end and the rear end of the shank, and the display blocks are arranged along the longitudinal direction of the shank.

13. The alerting structure of claim 1, wherein the operational value of the tool body is a torque value or an angle value.

* * * * *